US008668832B2

(12) United States Patent
Matousek et al.

(10) Patent No.: US 8,668,832 B2
(45) Date of Patent: Mar. 11, 2014

(54) WASTEWATER TREATMENT ONBOARD SMALL MARINE VESSELS

(75) Inventors: Rudolf Matousek, Richmond, TX (US);
Dana Casbeer, Angleton, TX (US);
David Hill, Sugar Land, TX (US);
Rubin Bariya, Houston, TX (US)

(73) Assignee: Severn Trent de Nora, LLC, Sugar Land, TX (US)

( * ) Notice: Subject to any disclaimer, the term of this patent is extended or adjusted under 35 U.S.C. 154(b) by 1027 days.

(21) Appl. No.: 12/727,957

(22) Filed: Mar. 19, 2010

(65) Prior Publication Data

US 2011/0226704 A1    Sep. 22, 2011

(51) Int. Cl.
*C02F 9/12*    (2006.01)

(52) U.S. Cl.
USPC ...... 210/748.17; 210/192; 210/142; 210/243; 210/758; 210/748.01; 210/757; 204/268; 204/269; 588/316; 588/406

(58) Field of Classification Search
USPC ......... 210/750, 202, 255, 266, 753, 908, 749, 210/748.01, 748.17, 142, 192; 204/267, 204/278.5, 555, 661; 588/316, 406
See application file for complete search history.

(56) References Cited

U.S. PATENT DOCUMENTS

| | | | |
|---|---|---|---|
| 4,197,200 A | 4/1980 | Alig | |
| 4,761,208 A * | 8/1988 | Gram et al. | 210/748.19 |
| 5,336,398 A | 8/1994 | Russell et al. | |
| 5,364,509 A | 11/1994 | Dietrich | |
| 6,106,703 A | 8/2000 | Nassef | |
| 6,136,186 A * | 10/2000 | Gonzalez-Martin et al. | 210/198.1 |
| 6,207,047 B1 | 3/2001 | Gothreaux | |
| 6,379,525 B1 | 4/2002 | Clements et al. | |
| 7,306,724 B2 | 12/2007 | Gordon | |
| 2004/0099607 A1 | 5/2004 | Leffler et al. | |
| 2004/0154918 A1* | 8/2004 | Casbeer et al. | 204/268 |
| 2007/0068826 A1 | 3/2007 | Morkovsky et al. | |
| 2007/0158276 A1 | 7/2007 | Markle | |
| 2008/0135478 A1 | 6/2008 | Zuback et al. | |
| 2008/0149485 A1* | 6/2008 | Childers et al. | 204/555 |

* cited by examiner

*Primary Examiner* — Joseph Drodge
*Assistant Examiner* — Cameron J Allen
(74) *Attorney, Agent, or Firm* — D'Ambrosio & Menon, PLLC; Usha Menon

(57) ABSTRACT

Methods, apparatus and systems for treating wastewater onboard small marine vessels. A pre-determined volume of wastewater generated onboard the vessel is mixed with a larger volume of seawater. This mixture is disinfected and subjected to further oxidation. The excess oxidants are neutralized and the treated effluent is discharged overboard the vessel.

8 Claims, 3 Drawing Sheets

WASTEWATER TREATMENT ONBOARD SMALL MARINE VESSELS

BACKGROUND AND SUMMARY

The present invention relates generally to wastewater treatment, and in particular, to the treatment and treatment of marine wastewater onboard small marine vessels.

The one or more embodiments of the invention comprise methods, apparatus and systems for the treatment of marine wastewater, wherein the systems or apparatus are installed on marine vessels. One or more embodiments include passing a pre-determined volume of wastewater or sewage generated onboard the vessel into a wastewater treatment apparatus. The wastewater treatment apparatus comprises a mixing spool, an electrolytic cell, one or more oxidation chambers and one or more dehalogenation chambers. A seawater-rich environment is maintained within the wastewater treatment apparatus by routing and mixing a pre-determined volume of seawater with the wastewater to be treated. The ratio of the seawater to the wastewater in the mixture is controlled, and may be at least 20:1. The seawater may be routed to the wastewater treatment apparatus at a rate of between 60-120 liters per minute and the wastewater may be routed to the wastewater treatment apparatus at a rate of between 1-6 liters per minute.

The wastewater and seawater mixture or solution may be then routed through the electrolytic cell where DC current and voltage are applied to the mixture. Sodium hypochlorite and mixed oxidants may be generated from the salt-laden seawater which may be used to effectively oxidize the wastewater. Significant changes to the wastewater may also take place due to the electrical field produced by the application of the electrical current and voltage and a rapid oxidation of the bacteria by the sodium hypochlorite and mixed oxidants.

Upon exiting the electrolytic cell, the mixture is further oxidized within the oxidation chamber, until the mixture is substantially fully oxidized by the hypochlorite and mixed oxidants. In one embodiment, each of the one or more oxidation chambers may further comprise one or more cylindrical oxidizer tubes. Proper turbulence may be maintained in the oxidizer tubes by adjusting their size and number. This adjustment may be further dependent on the volume of wastewater to be treated.

The substantially fully oxidized mixture is then treated with a pre-measured quantity of a reducing agent, followed by subjecting the mixture to a serpentine flow path within the one or more dehalogenation chambers. The serpentine flow path may ensure that the reducing agent is contacted with the mixture for an optimal time, preferably between 5 seconds to 30 seconds, to completely neutralize any remaining residual oxidants. Each of the one or more dehalogenation chambers may also comprise one or more cylindrical dehalogenation tubes.

A seacheck valve may be used to route the treated effluent overboard the vessel. A flow monitor may be incorporated into the process to ensure proper volumetric flow control. The flow meter may also ensure that optimal utilization of the reducing agent and sodium hypochlorite and mixed oxidants is maintained.

The International Maritime Organization (the "IMO") is a specialized agency of the United Nations and it is mainly tasked with the development and maintenance of a comprehensive regulatory framework for shipping. This includes safety and environmental concerns related to the maritime industry. IMO Resolution MEPC.159(55) provides guidelines on treated effluent standards. The one or more embodiments of the invention may meet or exceed the requirements for treated effluent under MEPC.159(55). The discharged effluent may comprise less than 25 mg/L Biological Oxygen Demand ($BOD_5$), less than 125 mg/L Chemical Oxygen Demand (COD), less than 100 cfu/100 ml coliform, less than 35 mg/L Total Suspended Solids (TSS), less than 0.5 mg/L total oxidants and pH between 6-8.5 in full compliance with MEPC.159(55).

DETAILED DESCRIPTION

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Various terms as used herein are shown below. To the extent a term used in a claim is not defined below, it should be given the broadest definition persons in the pertinent art have given that term as reflected in printed publications and issued patents at the time of filing.

Embodiments of the invention relate to methods and systems for the treatment of marine wastewater onboard a small vessel and/or stationary offshore platforms. As used herein, the term "onboard" refers to treatment within the same facility as the wastewater is produced (in contrast to treatment of such water at a site remote from the site of generation, such as at a municipal water treatment plant).

Figure 1:
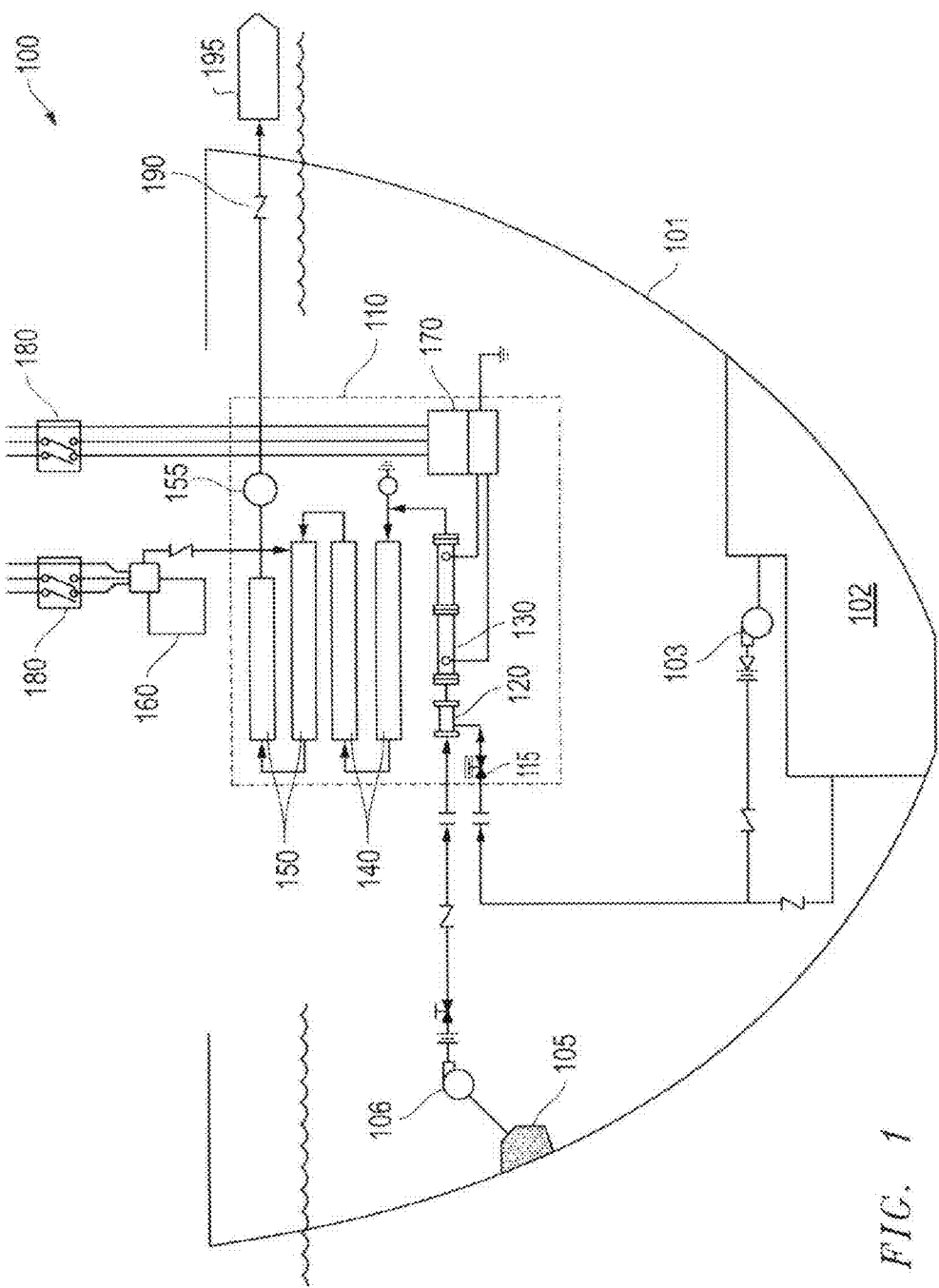
FIG. 1 is a flow sheet illustrating a wastewater treatment system according to one embodiment of the present invention.

FIG. 1 illustrates a specific, non-limiting embodiment, exemplifying a system 100 for treating marine wastewater onboard a small marine vessel 101 or a small craft. The system 100 comprises a wastewater treatment apparatus 110 in fluid connection with one or more storage or holding tanks 102 for the sewage to be treated. The wastewater treatment apparatus 110 may be placed in-line and downstream from a pump 103 transferring the sewage or wastewater from the wastewater holding tank 102.

Marine wastewater streams generally include sewage, black water, gray water and combinations thereof. As used herein, the term "black water" refers to water contaminated with human waste that comprises coliform and other bacilli. As used herein, the term "gray water" refers used water absent human waste, such as water from sinks and showers. Generally, marine wastewater is composed of both toxic and non-toxic organic and inorganic contaminants, micro and macro suspended solid contaminants comprising cellulose, sand, grit, human biomass, and emulsions and gases. One of the most commonly measured constituents of wastewater is the biochemical oxygen demand, or BOD. The amount of oxygen required for microbes to break down organic contaminants is known as the biochemical oxygen demand or BOD. The five-day BOD, or $BOD_5$, is measured by the quantity of oxygen consumed by microorganisms during a five-day period, and is the most common measure of the amount of biodegradable organic material in, or strength of sewage. Sewage high in $BOD_5$ can deplete oxygen in receiving waters, causing fish kills and ecosystem changes. The wastewater may further comprise suspended solids. Total Suspended Solids, TSS, is a measure of the total solid particles that are suspended in the wastewater. TSS may be organic in nature and can serve as safe havens for harmful bacteria and other microorganisms.

Onboard treatment of wastewater is generally utilized at those locations where there is limited access to a municipal water treatment plant or equivalent facility. Examples of such locations are ships and off-shore drilling platforms. One or more embodiments of the wastewater treatment apparatus may range in nominal treatment capacity from 2 to 10 cubic meters/day and may provide electrolytic treatment of both black and gray water. The wastewater treatment apparatus may be used in marine installations, such as small marine vessels, requiring light weight and small equipment footprint for the treatment of marine sewage. A typical cyclic operation aboard a yacht or small vessel occurs where black and gray water are collected in the vessel's holding tanks for treatment or off loaded to the shore if the vessel is docked. The wastewater treatment apparatus may be fully automated and provide for virtually maintenance free operation.

Referring back to FIG. 1, the wastewater holding tank 102 may incorporate a wastewater level sensor (not shown) to determine wastewater level. This level sensor may automatically initiate the wastewater treatment start and stop sequences when the wastewater treatment system 100 is set to an automatic mode and pre-determined threshold levels are reached. In another embodiment, wastewater treatment may be manually commenced. In yet another embodiment, the sewage transfer pump 103 may provide a signal to the wastewater treatment apparatus 110 when it commences transfer of wastewater to a mixing spool 120.

In one embodiment, the sewage transfer pump comprises a macerator for finely grinding solids suspended in the wastewater to reduce their particle size. The reduced particles have a significantly larger surface area in the wastewater stream thereby facilitating disinfection within the wastewater treatment apparatus 110. The macerated wastewater stream is routed to the wastewater treatment apparatus 110.

The wastewater treatment system 100 further comprises a seawater source or a holding or storage tank for seawater 105. The seawater is pumped 106 to the wastewater treatment apparatus 110 where it enters a mixing spool 120 along with the wastewater to be treated. A flow controlling ball valve (not shown) may be set on the sewage transfer pump 103 to ensure a desired or optimal flow rate into the wastewater treatment apparatus 110. The seawater transfer 106 may also be set to desired or optimal flow rates during the installation. The desired or optimal flow rates of the wastewater and seawater may be dependent on the treatment capacity of the wastewater treatment apparatus 110 which in turn may be dictated by the vessel onboard which the wastewater treatment apparatus 110 may be installed. The wastewater treatment apparatus 110 may be designed to treat between 2 to 10 cubic meters of wastewater per day. This may support up to 25 persons based on treatment of a mixture of black and gray water and 60 persons for black water treatment alone.

The seawater is routed to the mixing spool 120 at a rate of between 60-120 liters per minute, while the wastewater is routed to the mixing spool 120 at a rate of between 1-6 liters per minute. This ensures that the combined solution or wastewater-seawater mixture has a larger volume of the salt-laden seawater which is necessary for the oxidation and disinfection of the wastewater. The seawater and wastewater are mixed in the missing spool until an optimal solution is achieved. In one embodiment of the invention, the ratio of the seawater to wastewater in the mixture is at least 20:1. The mixture is routed to an electrolytic cell 130 for further treatment.

A 20:1 seawater to wastewater ratio provides the proper mixture to complete electrolytic and chemical oxidation in the electrolytic cell 130 resulting in an effluent that meets or exceeds the IMO treatment standards under MEPC.159(55). The electrolytic cell 130 generates an electric field through which the mixture is passed. The salty seawater provides a highly conductive solution, promoting the passage of electrical current and formation of hypochlorite and other mixed oxidants. The combined action of electrical charge and chemical oxidation reduce the $BOD_5$ and TSS concentration to below the levels set in MEPC.159(55).

The electrolytic cell 130 may comprise a tubular cell comprising an outer cathode, an outer anode and an inner bipolar electrode (not shown). The wastewater may flow between the inner and outer electrodes. In one embodiment, the outer anode and cathode may be produced from 2 1/2" schedule 5S seamless titanium pipe, ASTM 8337 Grade 1 or 2. The bipolar electrode may be produced from 2 3/8" O.D.×0.035" wall thickness seamless titanium tube, ASTM 8338 Grade 1 or 2. The anode may be coated with precious metal containing mixed metal oxide catalytic coating formulated for seawater conditions. Furthermore, the polarities may be reversed after each operation, thereby making the electrolytic cell 130 self-cleaning.

The electrolytic cell 130 facilitates onsite generation of sodium hypochlorite and mixed oxidants from seawater. Sodium hypochlorite is a powerful biocide and disinfecting agent. The process is based on the partial electrolysis of sodium chloride contained in the seawater. The wastewater-seawater mixture enters the electrolytic cell 130, where the electrodes are energized under direct anodic and cathodic current provided by power supply 180. In this condition, the sodium chloride (NaCl) from the seawater is dissociated as $Na^+$ ion and $Cl^-$ ion reacts at the anode to generate free chlorine. Successive chemical reactions take place in the-seawater among the products of the electrolysis: the OH— ions migrate from the cathode and react with $Na^+$ and $Cl^-$ near the anode, which produces sodium hypochlorite (NaOCl), mixed oxidants and byproduct hydrogen gas which exit the electrolytic cell 130. The sodium hypochlorite and mixed oxidants may further prevent marine growth in the mixture and disinfect and neutralize the coliform present therein and reduce $BOD_5$.

Figure 3:
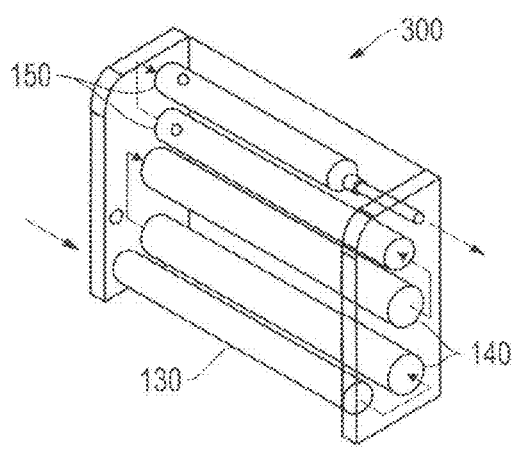
FIG. 3 is an illustration of a wastewater treatment apparatus in accordance with one embodiment of the present invention.

Referring to FIGS. 1 and 3, the electrolytic cell 130 may be connected to one or more oxidation chambers. To reduce coliform to the required limits, the oxidation reaction, commenced in the electrolytic cell, may require additional time and mixing. This is accomplished in the oxidation chamber adjacent to and following the electrolytic cell 130. A slight excess of oxidant may be maintained throughout the oxidation chambers. The one or more oxidation chambers further comprises one or more oxidizer tubes 140 depending on the flow rate or volume of wastewater requiring treatment. In one or more embodiments, the wastewater treatment apparatus 110 includes between 2-4 oxidizer tubes 140. The oxidizer tubes 140 comprise cylindrical pipes or tubing fabricated from PVC or stainless steel or any suitable light weight alloy known in the art. The wastewater-seawater mixture comprising entrained sodium hypochlorite, mixed oxidants and hydrogen gas exits the electrolytic cell 130 and enters the first of the one or more oxidizer tubes 140. The electrolytic cell 130 may be connected to a first oxidizer tube 140 by an elbow joint. Piping (not shown) connects each successive oxidizer tube 140 to its directly preceding oxidizer tube 140.

The oxidizer tubes 140 may have a pre-defined length and diameter to facilitate suitable mixing of hypochlorite and other oxidants for further oxidation of the mixture for an optimal time period. The dimensions of the oxidizer tube 140 may be dictated by the wastewater treatment capacity of the wastewater treatment apparatus 110. In one or more embodiments, each of the oxidizer tubes 140 may have a different diameter and/or length. The oxidizer tubes 140 may range in diameter from 2 inches to 6 inches, and from 3 feet to 5 feet in length. Turbulence may be achieved by subjecting the mixture to a flow path encompassing multiple oxidizer tubes 140 of varying dimensions. This turbulence further improves the mixing of the oxidants with the wastewater seawater mixture to facilitate substantially complete disinfection of the wastewater.

The oxidants, including any residual and excess oxidants, may be neutralized by injecting a pre-determined amount of a reducing agent. In one or more embodiments, the reducing agent may be selected from the group consisting of sodium bisulfite, sodium sulfite, sodium thiosulfate and sulfur dioxide.

Referring back to FIG. 1, in one or more embodiments, the reducing agent may be stored in a dehalogenation unit 160. The dehalogenation unit 160 may further comprise a metering pump. The metering pump may be pre-set during installation to balance with the amperage provided by the rectifier 180. In one or more embodiments, the metering pump may inject sodium bisulfite solution in the piping between the oxidation 140 and dehalogenation 150 chambers. The dehalogenation tubes 150 may be positioned and spaced to provide a serpentine flow path.

Referring to FIG. 3, the dehalogenation chamber 150 may comprise one or more cylindrical tubes or pipes fabricated from PVC or stainless steel or a suitable light weight alloy. In one or more embodiments, the dehalogenation chamber 150 comprises between 1 and 3 dehalogenation tubes 150. The dehalogenation tubes 150 may have a pre-defined length and diameter. In one or more embodiments, each of the dehalogenation tubes 150 may have a different diameter and/or length. The dehalogenation tubes 150 may range in diameter from 2 inches to 6 inches, and from 3 feet to 8 feet in length. In one or more embodiments, the oxidizer tubes 140 and the dehalogenation tubes 150 have the same dimensions. The dehalogenation tubes 150 are parallel to and disposed adjacent to the oxidizer tubes 140. The dehalogenation tubes 150 may be connected to each other and to the oxidizer tube 140 adjacent to a first dehalogenation tube 150 by piping. The dehalogenation tubes 150 provide a serpentine flow path which ensures optimal contact time for the reducing agent with the wastewater seawater mixture to completely neutralize the oxidants.

Referring back to FIG. 1, a seacheck valve 190 discharges the treated wastewater or effluent overboard 195 the vessel 101. Seacheck valves are known in the art. The seacheck valve may be designed with a disc that may open fully to allow unobstructed fluid flow through the valve. If the flow of the treated effluent reverses or if the flow of the treated effluent is reduced, the disc may close. This seals or blocks the return of the treated effluent back into the wastewater treatment apparatus.

The discharged effluent may comprise less than 25 mg/L Biological Oxygen Demand ($BOD_5$), less than 125 mg/L Chemical Oxygen Demand (COD), less than 100 cfu/100 ml coliform, less than 35 mg/L Total Suspended Solids (TSS), less than 0.5 mg/L total oxidants and pH between 6-8.5 in full compliance with MEPC.159(55).

The chlorine concentration of the discharged effluent may also be within the requirements of IMO Resolution MEPC.159(55) for effluent release to the marine environment without further processing.

Figure 2A:
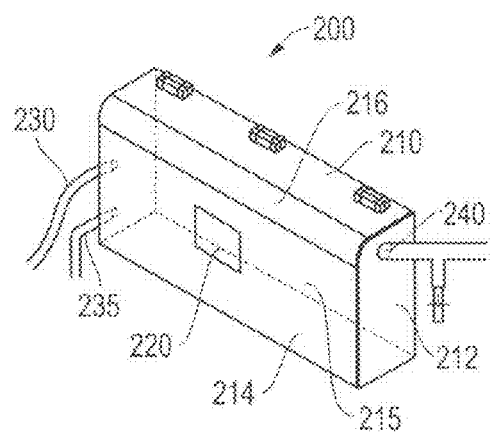
FIG. 2a is an illustration of a wastewater treatment apparatus with a closed access paneling in accordance with one embodiment of the present invention.

The wastewater treatment apparatus 110 may be positioned within a box-shaped enclosure. The wastewater treatment apparatus 110 may be portable. In one embodiment of the invention, illustrated in FIG. 2a, the enclosure 200 may be configured to be mounted on a wall. In another embodiment, not shown, the enclosure 200 may include one or more appendages allowing it to be a free-standing unit. Referring to FIG. 2a, the enclosure 200 comprises a top wall 210, a pair of opposing sidewalls 212, a bottom wall 214 and a rear wall 216 together defining a substantially box-shaped enclosure 200 having a frontal opening. In one or more embodiments of the invention, the enclosure 200 may be substantially rectangular shaped. The oxidizer tubes 140 and the dehalogenation tubes 150, referring to FIG. 3, may extend substantially the width of the enclosure. The enclosure may comprise one or more inlets on one of the sidewalls 212. The inlets may be configured to receive piping means for the wastewater 230 and the seawater 235. An opposing sidewall 212 may comprise an outlet for piping means 240 to route the treated effluent overboard. In one embodiment, the outlet piping means 240 may be coupled to a flow meter (not shown).

Figure 2B:
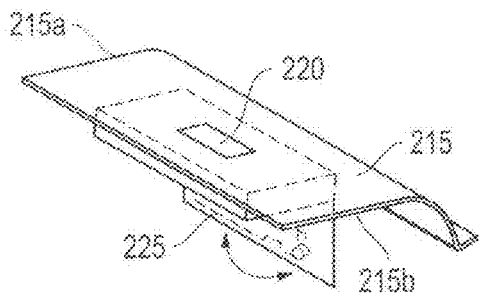
FIG. 2b is an illustration of a front access panel of a wastewater treatment apparatus in accordance with another embodiment of the invention.

The frontal opening may be covered by an access panel 215. The access panel 215 may comprise one or more tension springs (not shown) to facilitate its closure when swung up to a vertical position from a horizontal position. Referring to FIGS. 2a and 2b, the access panel 215 may further comprise a control screen 220 on a front face of the access panel 215a. In one or more embodiments, the control screen 220 may comprise a touch control or voice control system. The control screen 220 may be coupled to an electrical control plate 225 mounted on a back face of the access panel 215b.

The electrical control plate 225 may further comprise a programmable logic controller (PLC). The PLC may be used to program and control the operating functions for hypochlorite generation within the electrolytic cell, addition of the reducing agent by the dehalogenation unit, operating parameters flow control and an interlock system for the access panel.

In one embodiment, the interlock system (not shown) may be configured to detect when the sewage transfer pump begins pumping. The interlock system then signals the PLC to initiate one or more actions: 1) Provide seawater and wastewater to the mixing spool at a flow rate that may be preset when the wastewater treatment apparatus is installed on the marine vessel. The flow rate may be set using a flow meter. Referring back to FIG. 1, the flow meter 155 may be positioned within the wastewater treatment apparatus 110. In one embodiment, if the flow rate drops to 80% of design capacity, the PLC may sound an alarm and shut down the wastewater treatment system 100; 2) Activate the electrolytic cell 130 to commence hypochlorite generation; 3) Ensure that the voltage is within the required operating range. This may provide a secondary check for seawater salinity; 3) Confirm that the wastewater treatment apparatus 110 is operating at an optimal flow; 4)

Activate the dehalogenation unit 160 to introduce an optimal or pre-measured amount of a reducing agent and, 5) Ensure that the access panel interlock is functional.

Figure 5:
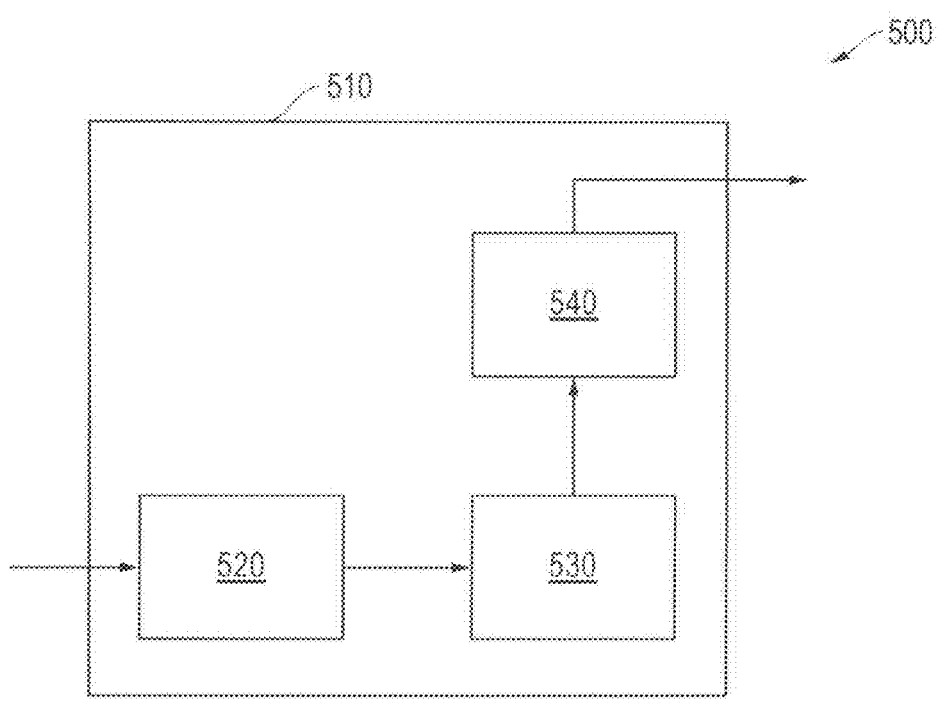
FIG. 5 is a flowchart of a modular wastewater treatment apparatus in accordance with one embodiment of the present invention.

Referring to FIG. 5, the wastewater treatment apparatus may comprise a modular wastewater treatment apparatus 510 comprising a plurality of modules. The wastewater treatment apparatus 510 may comprising a mixing module 520 for mixing wastewater with large volumes of seawater, an oxidation module 530 for generating hypochlorite and mixed oxidants for disinfection of the wastewater, and a dehalogenation module 540 for introducing a reducing agent to neutralize excess oxidants. The oxidation module 530 may further comprise at least one electrolytic cell and one or more cylindrical oxidizer tubes. The modular wastewater treatment apparatus 510 may be scalable depending on the volume of the wastewater to be treated.

Figure 4:
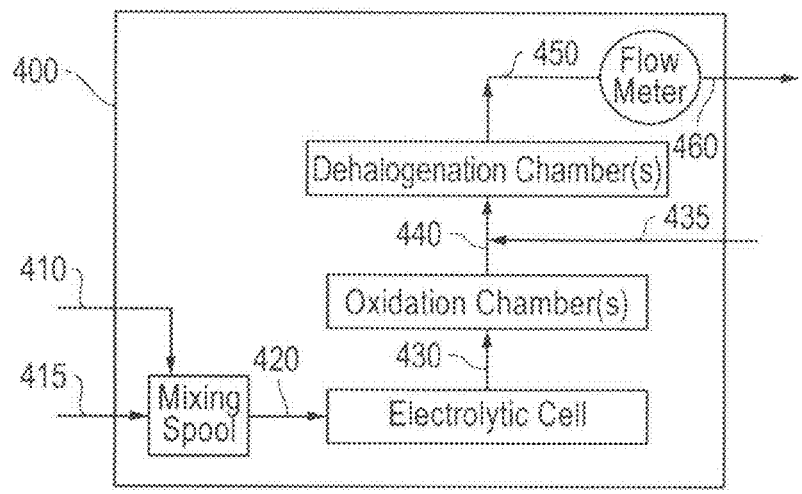
FIG. 4 is a flowchart in accordance with a method for treating wastewater in accordance with one embodiment of the present invention.

In another embodiment of the invention, referring to FIG. 4, a method for treating wastewater comprises routing a pre-determined volume of wastewater 410 and seawater 415 to a wastewater treatment apparatus 110. The wastewater and seawater are mixed within a mixing spool and the mixture is piped 420 to an electrolytic cell. As previously discussed, a seawater-rich environment may be maintained by controlling the ratio of seawater to wastewater to at least 20:1. In one embodiment of the invention, seawater enters the wastewater treatment apparatus 110 at a rate of 75 liters per minute and wastewater enters the wastewater treatment apparatus 110 at a rate of 3.78 liters per minute. This ratio provides the proper mixture to complete electrolytic and chemical oxidation in the electrolytic cell. The electrolytic cell generates an electric field through which the wastewaster and salty seawater passes. The salt water provides a highly conductive solution, promoting the passage of electrical current and formation of hypochlorite and other mixed oxidants. The combined action of electrical charge and chemical oxidation reduces the $BOD_5$ and TSS concentration to below levels set by the IMO effluent treatment standards in MEPC.159(55).

Hydrogen may also be produced as a by-product of the treatment in the electrolytic cell. However, the hydrogen may be kept entrained in solution due to the configuration of the oxidation and dehalogenation chambers, the integral piping and, the high flow rate of the seawater. In one or more embodiments, the hydrogen concentration is kept to less than 4% by volume and entrained until it exits the marine vessel. This arrangement maintains hydrogen below the flammable limits of 4% by volume.

The disinfected wastewater-seawater mixture is next routed 430 to an oxidation chamber where it is subjected to further oxidation within multiple oxidizer tubes, providing proper turbulence to complete the oxidation segment of the process. The fully oxidized mixture exiting the oxidation chamber 440 is then injected 435 with a pre-measured volume of a reducing agent, followed by further serpentine flow within the dehalogenation chamber thereby, ensuring proper contact to completely neutralize any remaining residual oxidants. After the treated effluent stream or treated wastewater exits 450 the dehalogenation chamber, the effluent is routed to a flow meter. The flow meter may be incorporated into the process to ensure proper flow control and optimal utilization of all ingredients. The flow meter may work in concert with the vessel's sewage pump to process collected wastewater in an automated and continuous batch operation. The treatment effluent may be discharged 460 overboard via the vessel's seacheck valve. The wastewater treatment cycle may be stopped when all or substantially all the wastewater/sewage has been treated.

Although not shown herein, the wastewater flow may be modified based on system optimization so long as the modification complies with the spirit of the invention, as defined by the claims. Additional process equipment, such as pumps, pipes or additional electrolytic cells or filtration units, may be employed throughout the processes described herein.

While the foregoing is directed to embodiments of the present invention, other and further embodiments of the invention may be devised without departing from the basic scope thereof and the scope thereof is determined by the claims that follow. The inventions are not limited to the described embodiments, versions or examples, which are included to enable a person having ordinary skill in the art to make and use the inventions when the information in this patent is combined with available information and technology.

The invention claimed is:

1. A method for treating wastewater using an apparatus positioned onboard a marine vessel, the method comprising:
introducing a pre-determined volume of wastewater into the apparatus, the apparatus comprising: an electrolytic cell, one or more oxidation chambers, one or more dehalogenation chambers and an integral flow meter;
providing a seawater-rich environment by routing and mixing a pre-determined volume of seawater with the wastewater, wherein a ratio of the seawater to the wastewater in the seawater and wastewater mixture is at least 20:1;
oxidizing and disinfecting the seawater and wastewater mixture by treating it through the electrolytic cell;
subjecting the oxidized and disinfected mixture to further oxidation within the one or more oxidation chambers until the oxidized and disinfected mixture is substantially fully oxidized;
introducing a pre-measured quantity of a reducing agent into the substantially fully oxidized mixture and routing the substantially fully oxidized mixture comprising the reducing agent to the one or more dehalogenation chambers;
providing a serpentine flow path within the one or more dehalogenation chambers, wherein the serpentine flow path ensures that the reducing agent is contacted with the substantially fully oxidized mixture for a time period sufficient to treat and neutralize residual oxidants, and
controlling, with the flow meter, a volumetric flow rate of a treated effluent exiting the one or more dehalogenation chambers,
wherein the wastewater includes sewage, black water, gray water and combinations thereof, and
wherein the wastewater is collected and treated in an automated continuous batch operation until substantially all the wastewater in the marine vessel has been treated.

2. The method of claim 1, wherein the seawater is routed to the apparatus at a rate of between 60-120 liters per minute and the wastewater is routed to the apparatus at a rate of between 1-6 liters per minute.

3. The method of claim 1, wherein the electrolytic cell further comprising at least one electrode, wherein polarities of the electrode are reversed at the completion of the treatment through the electrolytic cell for facilitating self-cleaning of the at least one electrode.

4. The method of claim 1, wherein the one or more oxidation chambers and the one or more dehalogenation chambers further comprising one or more cylindrical tubes.

5. The method of claim 4, further comprising providing turbulence within the one or more oxidation chambers to quickly and substantially fully oxidize the mixture.

6. The method of claim 1, further comprising ensuring that the reducing agent is contacted with the substantially fully oxidized mixture between 5 seconds to 30 seconds in order to neutralize the residual oxidants.

7. The method of claim 1, further comprising controlling access to the apparatus using a programmable logic control (PLC) device, the PLC device further controlling the volumes of the wastewater and the seawater in the mixture to be treated in the electrolytic cell, the treatment of the mixture in the electrolytic cell, and the introduction of the reducing agent.

8. The method of claim 1, further comprising discharging the treated effluent overboard the marine vessel, the treated effluent meeting or exceeding the effluent treatment guidelines of International Maritime Organization MEPC.159(55).

* * * * *